United States Patent [19]

Miller

[11] 4,014,704

[45] Mar. 29, 1977

[54] INSULATING REFRACTORY FIBER COMPOSITION AND ARTICLES FOR USE IN CASTING FERROUS METALS

[75] Inventor: William Clyde Miller, Denver, Colo.

[73] Assignee: Johns-Manville Corporation, Denver, Colo.

[22] Filed: Feb. 2, 1976

[21] Appl. No.: 654,318

Related U.S. Application Data

[63] Continuation-in-part of Ser. No. 512,786, Oct. 7, 1974, abandoned.

[52] U.S. Cl. .................. 106/38.22; 106/38.23; 106/38.27; 106/68; 106/69; 164/123; 249/202; 252/62
[51] Int. Cl.² .................................. B28B 7/36
[58] Field of Search ........... 106/38.22, 38.27, 38.3, 106/38.23, 38.5 R, 68, 69; 249/202, 197; 252/62; 75/96; 174/137 B; 164/123

[56] References Cited

UNITED STATES PATENTS

| | | | |
|---|---|---|---|
| 3,230,056 | 1/1966 | Arant et al. | 106/38.22 |
| 3,300,322 | 1/1967 | De Greer | 106/38.35 |
| 3,456,914 | 7/1969 | Konrad et al. | 106/38.27 |
| 3,800,111 | 3/1974 | Holmstrom | 174/137 B |

*Primary Examiner*—Lorenzo B. Hayes
*Attorney, Agent, or Firm*—Robert M. Krone; Joseph J. Kelly; James W. McClain

[57] ABSTRACT

An insulating composition useful for riser sleeves, hot tops, ladle liners, and the like articles for use in casting of molten ferrous metal is described. The composition comprises 30% to 50% refractory fiber, 1% to 35% granular silicon carbide, inorganic binder, organic binder, and refractory filler. Molten steel at temperatures on the order of 3,000° F can be readily handled by the articles of this composition. They also afford superior heat insulating properties and in the form of riser sleeves allow molten metal in a riser to remain molten for a longer period before solidification.

13 Claims, No Drawings

INSULATING REFRACTORY FIBER COMPOSITION AND ARTICLES FOR USE IN CASTING FERROUS METALS

CROSS-REFERENCE TO RELATED APPLICATIONS

This application is a continuation-in-part of application Ser. No. 512,786, filed Oct. 7, 1974, now abandoned.

BACKGROUND OF THE INVENTION

1. Field of the Invention

The invention herein relates to riser sleeves, hot tops, ladle liners and similar objects for use in the casting of molten metal. More particularly, it relates to an insulating refractory fiber composition from which such articles for use in the casting of molten metals (especially molten ferrous metals) can be formed.

In the casting of molten metals there are steps in which the molten metal must be held in receptacles for conveying, risering, and the like. In each of these applications it is required to minimize the cooling of the molten metal and the possibilities of the metal attacking the receptacle structure. Therefore riser sleeves, ladle liners, and similar articles are formed of refractory materials and utilized as described below.

In the casting of molten metal it is common practice to provide a riser or reservoir communicating with the actual mold cavity. As the metal within the mold cavity cools it contracts, and the riser serves as an additional molten metal supply to maintain a full quantity of metal within the mold cavity. Since the riser itself also solidifies on cooling means must be provided to keep metal in the riser molten for as long as possible in order to allow the riser to serve its function as a reservoir and source of molten metal. It has become common practice to line the interior surface of the riser hole with either an insulating material or an exothermic material. These linings are generally referred to as "riser sleeves" or "hot tops." The insulating type of riser sleeve serves to retain the heat of the molten metal in the riser and thus delay the cooling and solidification of the riser. The exothermic type of riser sleeve contains material which will burn when placed in contact with the molten metal and thus provides an external heating source to the riser. The riser sleeves of the present invention are of the insulating type.

Similarly, the ladles used to convey molten metal must provide insulating or exothermic liners to minimize heat loss and cooling of the metal. In the case of the ladle liner, it is also important that the attack of the metal on the ladle structure itself be minimized. The ladle liner should be as resistant as possible to attack of the molten metal, so that the ladle need not require frequency relining.

Riser sleeves, ladle liners, and the like intended for use with molten ferrous metals must be able to withstand temperatures and thermal shocks greater than those used with the casting of nonferrous metals. This is because the melting points of the ferrous metals are generally considerably higher than the melting points of many common nonferrous metals such as aluminum, copper, lead, zinc and the like as well as that of several common alloys such as bronzes and brasses. Such used herein, "ferrous metals" means those predominately consisitng of iron, nickle, chromium and related elements such as the various cast irons and steels. In practice the invention herein will find its principal use in the casting of steel and steel alloys.

2. Description of the Prior Art

Since molten metal casting is an old and well studied art there is a large number of patents dealing with refractory compositions, configurations and methods of manufacture. Those which may be considered to have more than average pertinence to the present invention include U.S. Pat. Nos. 3,077,413; 3,092,247; 3,100,734; 3,321,171; 3,344,838; 3,352,743; 3,456,914; 3,478,999; and 3,558,591, and British Pat. No. 894,056. All these patents deal with insulating compositions which contain refractory materials including refractory fiber.

BRIEF SUMMARY OF THE INVENTION

The invention herein is a refractory composition capable of being formed into riser sleeves, hot tops, ladle liners and the like for containing molten ferrous metal, which comprises in percentage by weight:

| | | |
|---|---|---|
| Refractory Fiber | 30% – | 50% |
| Granular Silicon Carbide | 1% – | 35% |
| Inorganic Binder | 5% – | 45% |
| Organic Binder | 2% – | 10% |
| Refractory Filler | 5% – | 35% |

The refractory fiber must be one which is entirely or at least predominatly alumino-silicate fiber.

Also within the scope of the present invention is a riser sleeve article which is self-supporting, shape retaining, resistant to the thermal and chemical effects of contact with molten ferrous metals, resilient, easily handleable and resistant to breakage during handling. The riser sleeve is composed of the above composition of materials and is formed generally in the shape of a hollow cylinder, which may be a right cylinder or a tapered cylinder.

Also within the scope of the present invention are insulating boards made of the present composition and which can be formed to be placed in an abutting relationship as a lining for the riser hole and to thus form a reservoir retaining chamber analogous to a riser sleeve.

Also within the scope of the present invention is a shape retaining ladle liner formed of the above described composition which can be simply inserted into a ladle, thus eliminating the tedious troweling and lay-up required of prior ladle liners made of refractory cements.

DETAILED DESCRIPTION AND PREFERRED EMBODIMENTS

A principal component of the present composition is refractory fibers. These refractory fibers are inorganic fibrous materials which are synthetically formed as opposed to natural mineral fibers such as asbestos. In the composition of the present invention it is required that more than half of the fibrous component be synthetic alumino-silicate fibers. These are fibers formed from melts of alumina and silica or predominantly of alumina and silica with lesser amounts of added oxides such as titania, zirconia, or chromia. Typical of such materials are commercial refractory fibers sold by Johns-Manville Corporation under the trademarks CERAFIBER and FIBERCHROME. It is preferred in this invention that the refractory fiber component be entirely composed of synthetic alumino-silicate fibers.

However, in the interest of economy it may at times be desirable to incorporate a minor portion (less than half) of refractory fibers other than the predominant alumino-silicate fibers. These other refractory fibers will generally comprise fibers formed from melts of compositions predominately of silicates of calcium, aluminum and the like di- or tri-valent metal oxides and may include such materials as rock wools, mineral or slag wools and various ceramic fibers. The refractory fiber component of the present composition will comprise 30% to 50% by weight of the composition, preferably 35% to 45% by weight.

The second component of the present invention, and one which imparts to the composition its particularly superior performance in the presence of molten ferrous metals, is granular silicon carbide. The silicon carbide will be ground particles of SiC formed by the reaction of silicon and carbon. Commercial granular silicon carbide contains approximately 80% or greater of SiC with the remaining material being unreacted carbon and silicon. Grain size will be at least −60 mesh, and preferably will be in the range of −60 to +325 mesh (all mesh sizes are U.S. sieve series), more preferably in the range of −200 to +325 mesh. The granular silicon carbide will be present as from 1% to 35% by weight of the composition, preferably as from 3% to 15% by weight. The reasons for the unexpected effects of the silicon carbide are not known with certainty. However, it is believed that the silicon carbide provides a unique combination of the properties of opacity to radiative heat transfer and "non-wettablility" of the composition by molten metal.

Also in the present composition is an inorganic binder component. This may be any of a variety of inorganic refractory binders such as clay, alkali metal silicate binders such as sodium or potassium silicate, borax, phosphoric acid and assorted phosphates or salts such as aluminum phosphates, colloidal mica, colloidal silica, colloidal alumina and the like. In many instances it will be desirable to use a combination of two or more of these inorganic materials to form the binder component. The inorganic binder will be present as from 5% to 45% by weight of the composition, and preferably from 20% to 40% by weight.

Also present will be an organic binder to provide "green strength" and improve handleability. This may be any conventional organic binder such as resins, starch, glues, dextrin and the like, of which colloidal starch is preferred. The organic binder will be present as from 2% to 10% by weight of the composition.

The composition will also contain an inorganic refractory filler generally in the form of granular material. Suitable fillers include salvage or scrap from either unused or used riser sleeves of this invention, assorted refractory grogs and particles of alumino-silicate composition, kyanite, mullite, calcined kaolin, alumina silica. Mixtures of these materials may also be used. These fillers serve to densify the composition and also add a degree of a refractoriness. It is, of course, required that the fillers be themselves sufficiently refractory to serve in the molten metal contact environment so that they do not adversely affect the performance of the riser sleeve, ladle liner or the like article. For this reason many common filler materials, both organic and inorganic, will be insufficiently refractory to be suitable for use herein. Those skilled in the art will be well aware of which filler materials may be advantageously used herein. Particularly preferred as fillers are those materials which are predominately alumino-silicate, such as ground bauxite, mullite and kyanite. The filler will be present as from 5% to 35% weight percent of the composition, preferably from 15% to 35% of the composition.

The riser sleeves (or "reservoir retaining chambers"), hot tops, ladle liners and the like articles of this invention for use with molten ferrous metal can be formed and produced from the above composition by means of conventional techniques for shaping and integrating an admixture of fiber, binder and particulate material into a shape retaining configuration these techniques include common means of casting, molding, and the like. In one preferred method, which is found to produce good uniformity and consistency, the materials are integrated and consolidated into a body of the desired shape from a dispersion of the ingredients in an aqueous or similar suspending medium by filter molding. The typical riser sleeve or ladle liner configuration, for instance, can be expediently formed by vacuum filter molding with perforated or screened male or female molds defining the configuration. The solid components are filtered from the dilute slurry of the fiber, binder and particulate and formed by accretion as the liquid medium is drawn through the perforated mold and the solids retained thereof. When the desired thickness of solid material has been obtained the mold and attached solids are removed from the aqueous medium and the resulting formed body stripped from the mold and thereafter dried. It will normally be the inside surface of the article which is molded to a specified dimension to fit a specified riser hole or ladle diameter. Certain circumstances may, however, dictate molding of the outside diameter to a specified dimension.

It will be noted that the compositions herein produce a shape retaining configuration immediately upon withdrawal from the mold so that the wet article is both handleable and shape retaining prior to drying. Similar shape retaining and handleable articles can also be obtained by techniques such as pan casting or press molding of more concentrated slurries, followed by removal of the water and stripping of the shaped article from the mold. In the wet form the composition can be molded into flat sheets and sealed in plastic containers to retain the moisture present (the composition thus not being subjected to drying at this stage). The sealed package is commonly referred to as a "wet pack". The user thereafter takes the wet (but shape-retaining) composition from the package and molds it to the desired configuration. Subsequent performance is unaffected by this molding technique, which may find particular application in the formation of tundish liners, ladle liners, and similar liners for steel casting.

Riser sleeves of this invention will typically be hollow, cylindrical sleeves measuring up to approximately 12 inches in length and having internal diameters of from about 1 to 24 inches. Ordinary foundry practice commonly requires an assortment of riser sleeve diameters, of from about 1 to 24 inches. Ordinary foundry practice commonly requires an assortment of riser sleeve diameters, generally in one-half inch increments between 1 and 24 inches. Wall thicknesses are commonly approximately three-eights to one inch and the dried riser sleeve product has an approximate dry density of about 10 to 30 pounds per cubic foot.

In a first experiment, a composition of this invention was used to form a test riser sleeve and that test riser sleeve compared against two common commercial riser sleeves. The test riser sleeve (having a wall thickness of five-eights of an inch) was made from the following composition, in which all percentages are by weight:

| | |
|---|---|
| Alumino-silicate fiber (commercially available from Johns-Manville under the tradename CERAFIBER) | 40% |
| Granular silicon carbide (dust bag collected granules, −200 to +325 mesh; comercially available from Exolon Corp. under the tradename "Carbolon DCF") | 7% |
| Inorganic Binder (a mixture of 10 parts by weight colloidal silica, commercially available from Nalco Chemical Co. under the tradename "Nalcoag 1115" with 18 parts by weight of ball clay commercially available from Old Hickory Clay Co. under the tradename "6-S Clay") | 28% |
| Cationic starch binder (commercially available from Stein Hall Co. under the tradename "Supercharg TPG") | 5% |
| Granular aluminum silicate filler (ground bauxite commercially available from C.E. Minerals under the tradename "Mulcoa 70", grain size of from −200 to +325 mesh) | 20% |

The test riser sleeve was compared with a commercial riser sleeve A, a one-half inch thick insulating sleeve, and a commerical riser sleeve B, a one-inch thick slightly exothermic sleeve. In this test a sand mold was made consisting of three bottom grated test castings, 12 inches wide by 12 inches long by 5 inches deep, placed equidistant from each other and the edges of the flask connecting the mold. Each casting was risered by one of the three riser sleeves, each having an eight inch inside diameter and being 12 inches high. The castings and risers were simultaneously filled from the bottom with molten carbon steel at a temperature of 2990° F until the steel level reached the top of the sleeves. Six hundred grams of hot topping compound was poured on the top of each riser. Thermocouples placed on the exterior surface of each sleeve, six inches down from the top edge, and connected to a multi-point temperature recorder, monitored the temperature increase and thus measured the heat loss through the sleeve wall.

After 75 minutes the exterior surface of commercial sleeve A reached a maximum of 1340° F. After 90 minutes the exterior temperature of commercial sleeve B reached a maximum temperature of 1260° F. Also after 90 minutes the exterior surface of the test sleeve of the composition of this invention reached a maximum temperature of 1110° F. This indicates that the composition described herein was retaining more heat, thus keeping the steel and the riser molten for a longer period of time and thereby feeding the casting below more efficiently.

The mold was allowed to cool for 24 hours and the castings and risers were removed from the sand mold. The riser which had been encased by the test riser sleeve had the smoothest surface and the least amount of burn near the casting, indicating less collapse of the sleeve and attack of the molten steel. The grating was then removed and each riser and casting was sectioned longitudinally. The depth of the pipe formed in the riser insulated by the sleeve of this composition extended deeper than the pipes in either of the other two risers insulated by the commercial sleeves A and B. Pipe depth results correlate with the heat loss data again indicating more efficient feeding of the casting beneath the riser insulated by the sleeve of the present composition.

In a second experiment, a second riser sleeve of the above composition formed as described was tested directly against a riser sleeve of the type described in the above-cited U.S. Pat. No. 3,456,914. The prior art riser sleeve made in accordance with the patent was composed of 50% refractory fiber, 20% clay binder, 5% starch binder, 15% colloidal silica binder and 10% of a granular alumino-silicate filler. The specific materials used were the same as or equivalent to those described above. Both riser sleeves had average wall thicknesses of ⅝ inch (0.625 inch). To particularly emphasize the difference between the riser sleeve of the present invention and that described in the patent, granular alumino-silicate filler (which is merely described as optional in the patent) was included in the latter. Inclusion of this filler produces a version of the prior art riser sleeve which would be expected to be closer in its properties to the present riser sleeve than some other versions of riser sleeves which are also within the scope of the patent. By comparing the present riser sleeve to the filled version of the prior sleeve, this experiment provides a more rigorous comparison and one which more clearly emphasizes the superior nature of the silicon carbide containing riser sleeve of the present invention.

The two riser sleeves were set into a sand mold at a commercial foundry in a conventional manner. 180 pounds of steel was poured into each of the riser sleeves at a temperature of approximately 3045° F ± 15° F. Immediately after pouring the risers were covered with ceramic boards to reduce heat loss. The risers were then allowed to cool for approximately six hours. Thereafter, the riser sleeves were broken away and the steel risers were transferred to a laboratory where they were cleaned with light sand blasting, typical of normal foundry practice.

Massive areas of incursion of the riser into the wall of the prior art riser sleeve were observed. At some points the riser burned essentially completely through the sleeve. The riser itself showed a highly irregular roughened surface where the steel reacted with the sleeve and bulged out extensively. The riser sleeve of the present invention, on the other hand, contained the riser quite well and suffered substantially less reaction with the steel riser. At no point was there any burn through of the sleeve. The maximum incursion into the sleeve (at the bottom) was only slightly more than half the sleeve thickness. The external appearance of the riser was also substantially better than that of the riser from the prior art sleeve, showing a relatively smooth and unreacted surface. The following Table presents actual measurements of riser incursion into the 0.625 inch thick wall of each sleeve (all dimensions are in inches):

TABLE

| Sleeve Level | Riser of This Invention | | | Riser of U.S. Patent No. 3,456,914 | | |
|---|---|---|---|---|---|---|
| | Circumference | Diameter | Burn In | Circumference | Diameter | Burn In |
| Top | 26.0 | 8.3 | 0.13 | 27.0 | 8.6 | 0.30 |
| Mid Height | 27.1 | 8.6 | 0.32 | 28.9 | 9.2 | 0.60 |

TABLE-continued

| Sleeve Level | Riser of This Invention | | | Riser of U.S. Patent No. 3,456,914 | | |
| --- | --- | --- | --- | --- | --- | --- |
| | Circumference | Diameter | Burn In | Circumference | Diameter | Burn In |
| Bottom | 27.5 | 8.7 | 0.37 | 28.3 | 9.0 | 0.50 |

In addition, it was observed that there were areas were the reaction between the molten steel and the prior art riser sleeve was so severe that melted reacted sleeve material adhered to the surface of the steel so strongly that the subsequent sand blasting could not remove it. In an actual foundry application this would be highly objectionable because the adhered material would become an impurity when the riser was remelted to be recycled in subsequent pourings. The riser poured in the present sleeve, however, showed no such reaction with the sleeve material.

What I claim is:

1. In a refractory composition suitable for use for containment of molten ferrous metal in casting operations, which comprises, in percentage by weight, 30% to 50% refractory fiber, 5% to 45% inorganic binder, 2% to 10% organic binder, and 5% to 35% refractory filler, and wherein more than half of said refractory fiber component is alumino-silicate fiber, the improvement which comprises further incorporating into said composition 1% to 35% by weight granular silicon carbide.

2. The composition of claim 1 wherein the refractory fiber component consists essentially of alumino-silicate fiber.

3. The composition of claim 1 wherein the granular silicon carbide component comprises at least 80% silicon carbide particles having a particle size of −60 mesh.

4. The composition of claim 3 wherein the granular silicon carbide component comprises at least 80% silicon carbide particles having a particle size in the range of −60 to +325 mesh.

5. The composition of claim 1 comprising, in percentage by weght: refractory fiber 35% to 45%, granular silicon carbide 3% to 15%, inorganic binder 20% to 40%, organic binder 2% to 10% and refractory filler 15% to 35%, and wherein more than half of said refractory fiber component comprises alumino-silicate fiber.

6. The composition of claim 5 wherein the refractory fiber component consists of essentially of alumino-silicate fiber.

7. The composition of claim 5 wherein the granular silicon carbide component comprises at least 80% silicon carbide particles having a particle size of −60 mesh.

8. The composition of claim 5 wherein the granular silicon carbide component comprises at least 80% silicon carbide particles having a particle size in the range of −60 to +325 mesh.

9. The composition of claim 5 wherein said inorganic binder comprises a mixture of colloidal silica and clay.

10. The composition of claim 5 wherein said refractory filler comprises granular alumino-silicate material.

11. A shape retaining, self-supporting, resilient, thermally and chemically durable riser sleeve for containing molten ferrous metals which comprises a hollow cylinder formed from the composition of claim 1.

12. A shape retaining, self-supporting, resilient, thermally and chemically durable insulating board for use in contact with molten ferrous metal composed of the composition of claim 1.

13. A shape retaining, resilient, thermally and chemically durable insulating board as in claim 12 comprising a ladle liner.

* * * * *

UNITED STATES PATENT AND TRADEMARK OFFICE
CERTIFICATE OF CORRECTION

PATENT NO. : 4,014,704
DATED : March 29, 1977
INVENTOR(S) : William Clyde Miiller It is certified that error appears in the above-identified patent and that said Letters Patent are hereby corrected as shown below:

[75] Inventor: "William Clyde Miller" should read --William Clyde Miiller--.

Column 1, line 56, "frequency" should read --frequent--.

Column 3, line 31, "non-wettablility" should read --non-wettability--.

Column 5, line 17, "filer" should read --filler--.

Column 8, line 10, Claim 5, "weght" should read --weight--.

Signed and Sealed this

Twenty-eighth Day of June 1977

[SEAL]

Attest:

RUTH C. MASON
Attesting Officer

C. MARSHALL DANN
Commissioner of Patents and Trademarks